J. WILCOX.
APPARATUS FOR MAKING TOILET ARTICLES FOR PERSONAL WEAR.
APPLICATION FILED APR. 18, 1908.

971,712.

Patented Oct. 4, 1910.

2 SHEETS—SHEET 1.

Witnesses
C. F. Nisson
C. I. Hartnett

Inventor
J. Wilcox
By Attorneys
Southgate & Southgate

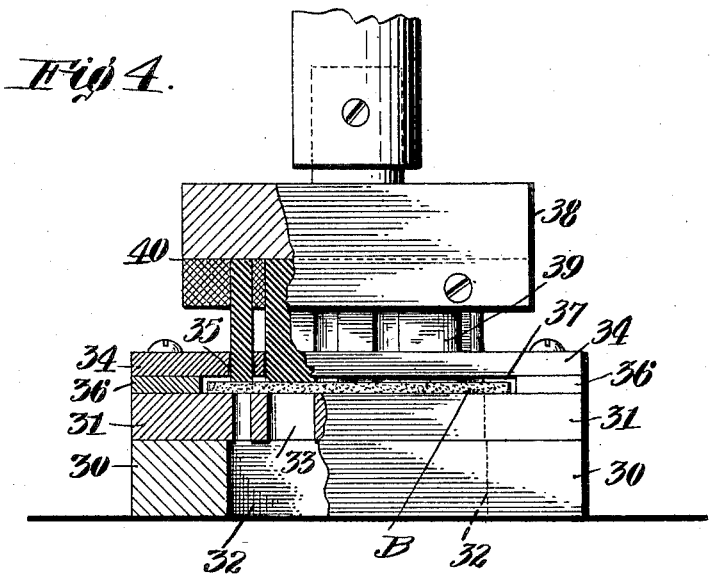
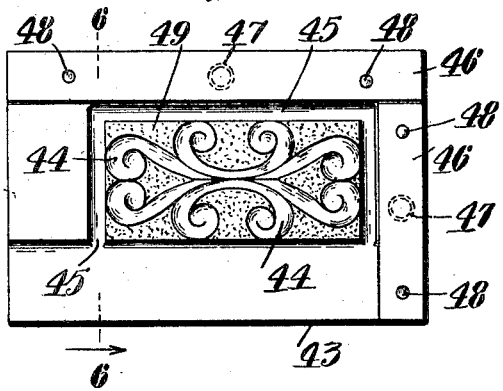
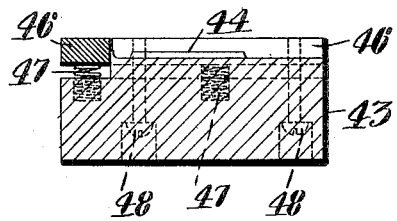

UNITED STATES PATENT OFFICE.

JOSEPH WILCOX, OF ATHOL, MASSACHUSETTS.

APPARATUS FOR MAKING TOILET ARTICLES FOR PERSONAL WEAR.

971,712.　　　　　Specification of Letters Patent.　　Patented Oct. 4, 1910.

Application filed April 18, 1903. Serial No. 427,839.

*To all whom it may concern:*

Be it known that I, JOSEPH WILCOX, a citizen of the United States, residing at Athol, in the county of Worcester and State of Massachusetts, have invented a new and useful Apparatus for Making Toilet Articles for Personal Wear, of which the following is a specification.

This invention relates to an apparatus for making ornamental backs and other parts of combs and similar articles which are formed from sheets of celluloid, viscoloid, pyroxylin, pyralin, shell, horn, rubber or any other material from which such articles may be produced.

The principal objects of the invention are to provide a simple and practicable means for rapidly producing that class of stamped or molded articles which are perforated and in which the surfaces of the skeleton between the perforations are rounded over so as to produce a pleasing and ornamental effect; to provide in connection therewith means whereby the comb blanks may be properly placed in position in the dies without taking measurements or trusting to any accuracy of adjustment on the part of the operator; to provide means for simultaneously curving the blanks when they are being molded or embossed; to provide means for forming all these operations substantially simultaneously; and in general to improve and simplify the apparatus for accomplishing the above mentioned results.

Figure 1:
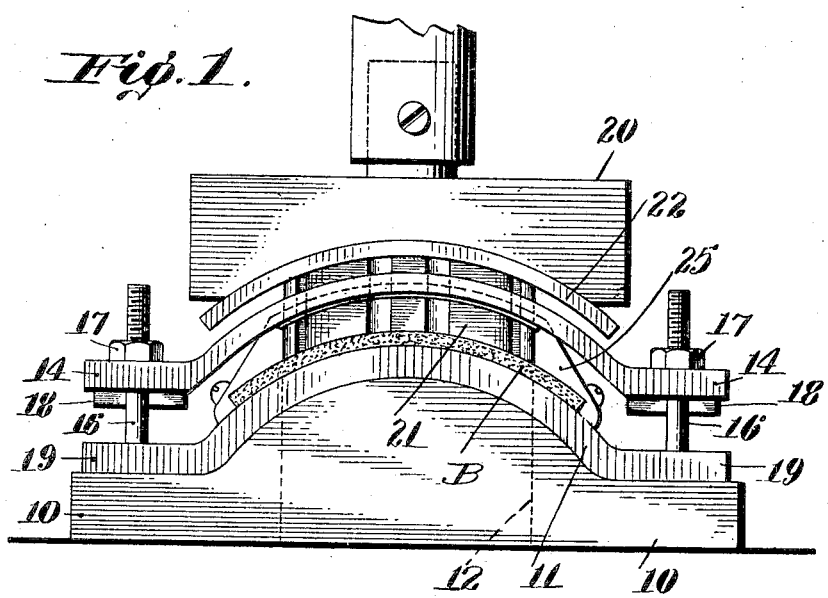
Figure 2:
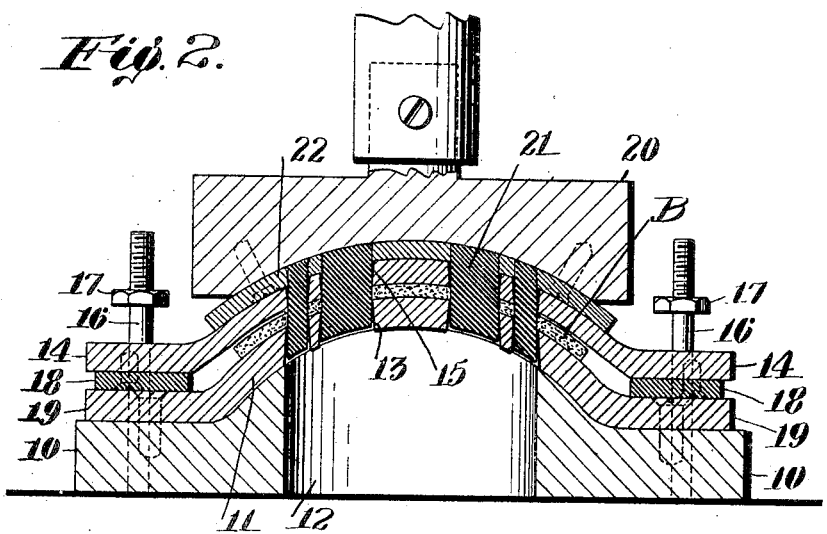
Figure 3:
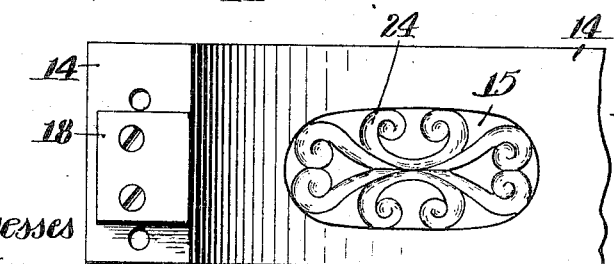

Reference is to be had to the accompanying drawings which show certain forms in which the invention may be carried out and in which, Figure 1 is a side elevation of one form of apparatus. Fig. 2 is a longitudinal sectional view of the same showing the parts in the position which they assume when the blank is to be embossed or molded on the back. Fig. 3 is a bottom plan view of the embossing or molding die. Fig. 4 is an elevation partly in section showing another form in which the invention may be embodied; Fig. 5 is a bottom plan view of an embossing die adapted to be used in connection with the apparatus shown in Fig. 4, and Fig. 6 is a central view thereof on the line 6—6 of Fig. 5.

The molding and manipulation of celluloid, pyroxylin, and similar plastic materials, after the same have once been produced or molded in the form of sheets, to change that form is attended with many difficulties. In the first place it is well known that the celluloid, as well as kindred substances, tends to return to its original condition, that is, to the flat sheet form in which it was originally produced from a shapeless mass of plastic material. Even when a flat object is desired it is necessary to provide for keeping it flat as the heating of the blank sometimes warps it. Several ways have been devised for attempting to overcome this natural tendency of the celluloid, but there are some forms of articles which have been produced in a permanent condition only with great difficulty and somewhat expensive manipulations. One of these forms is that which is perforated or punched to produce a figure of what may be called a skeleton form and in which it is desired to provide rounded over edges between the perforations. One of the objects of this invention is to provide a simple, effective, and convenient means for accomplishing this result.

According to this invention the results are obtained entirely by means of dies or stamps which are so formed and so manipulated that the comb back or the like although formed from an ordinary flat sheet of plastic material is left at the end of the process in a permanent form so that it will retain its shape unless it is heated so as to destroy the condition of the stresses set up in the material. One of the great difficulties which has been met with heretofore in making this particular class of goods is that if the rounded ornamentation on the back of the comb or the like is to be on a bent or curved surface, and is made before the comb is curved, the said ornamentation is destroyed or at least injured by the curving process which requires the reheating of the comb to a sufficient degree to permit the molecules to set in new relations to each other. It is obvious that when so heated it is extremely difficult to retain the molded forms in their original shape. If the process is reversed, also the same condition confronts us because the reheating of the comb after it is bent or curved to permit embossing will destroy the curved form or at least cause it to straighten out to a certain degree. In order to overcome these difficulties and yet produce the article entirely by dies or stamps, this method is carried out in either one of two ways. In the first case the heated blank may be put in a flat condition between two perforated dies the upper one of which has an intaglio surface between the perforations thereof, and then a third punching or cutting die may be brought down upon it to perforate it: The cutting die may be caused to carry the intaglio die down on the surface of the blank and emboss the same at the same time that it is curved or bent. In the other procedure the blank is heated and placed in the perforated dies after which the punching dies are brought down upon it and the blank is then removed to the embossing die which has an intaglio surface. The blank is then pressed in the embossing die preferably without changing its heat which gives it its desired form. If it is wished to make the article of a curved shape, the embossing dies may be curved to the desired curvature as in the other case.

This is a broad description of the method which may be employed.

This invention will be better understood by a description of the mechanism as shown in the accompanying drawings which will now be given.

In the form of the invention shown in Figs. 1, 2 and 3 it will be seen that there is a base 10 which, if the article is to be bent or curved while it is otherwise being molded, is provided with a curved die plate 11 fixed on the base. The base is provided with a single opening 12 and the die plate is provided with perforations 13 extending down into this opening. These perforations are of a tapering form for a purpose which will be referred to hereinafter. The blank B is placed on the plate 11. Located above this plate and wholly above the blank when the press starts is a second die plate 14 having perforations 15 similar to the perforations 13 and in fact located exactly above them and of exactly the same shape. These perforations also may be tapered. While the perforations 13 are smallest at their upper edges, the perforations 15 are smallest at their lower edges. The plate 14 is mounted on vertical guides 16 which are provided with stops 17, shown in the form of nuts mounted on screw-threads on the guides 16 so that they may be adjusted. The plate 14 is also provided with fixed stops 18 adapted to come into contact with the ledges 19 on the plate 11 to hold the plate 14 at a proper distance therefrom. Above the plate 14 is located a plunger having a head 20 which is provided with a series of projecting cutting dies or die punches 21. These dies may be fixed to the face of the head 20 in any desired way. In the form shown in Fig. 2 they are set into a metal plate 22 which is fixed to the head 20. They are, as will readily be understood, of the same size and shape as the perforations 13 and 15 and are intended to project through both of them when the plunger is lowered. If the article to be operated upon is intended to be curved or bent during the process, the plates 11 and 14 and the plunger head 20 are made of such a curved form as will secure the desired result. The lower surface of the plate 14 is provided with a depressed rounded intaglio embossing surface 24 on the skeleton part thereof; that is, the part between the perforations 13. This is of such form that what would otherwise be the square edges of the blank after perforation, are rounded over by the rounded surfaces of the intaglio design.

The operation of the device when constructed in the form above described is as follows. With the parts in the position shown in Fig. 1, the comb blank B is introduced into the device just above the plate 11 and is brought up against the gage 25 at the rear of that plate. This locates the blank in proper position. The device is preferably used in connection with a die press or similar machine which is then caused to operate to bring down the plunger head 20. The first operation of this is to force the die punches 21 down through the plate 14 and then through the blank and plate 11. This punches out the blank or perforates it and forces the cut-out particles down through the opening 12. The tapered surfaces of the perforations 13 and 15 will now be understood. The former are to provide a clearance for the die punches and the same is true of the latter and in addition they serve to assist in guiding them into proper position. The upper plate also serves as a stripper to permit the die punches to be raised without lifting the blank. It will be seen that the die punches bring the blank down on the surface of the plate 11 in the final form in which it is to be left but this would not be sufficient to permanently bend it and consequently after they have passed through the blank the punches are not depended upon to hold the latter in position but the plunger head or plate 22 comes down on top of the plate 14 and forces the latter down on the blank. As soon as the stops 18 engage the flanges 19, the downward motion of the plunger head of course is arrested and it is retained in this position for several seconds in order to allow the heated blank to become thoroughly set in its new form between the die plates 11 and 14. The thickness of the stops 18 is made such that the embossed or intaglio design 24 of the upper die plate will be impressed into the surface of the blank and as this design exactly corresponds with the skeleton of the blank and its edges come down over the edges of the latter and its center curves gradually upwardly therefrom, it will be seen that the article produced is not only bent into proper curved shape but is brought out of the dies with curved upper surfaces such as have heretofore been produced in a separate operation and with a separate heating. In the form shown in the other figures, the operation is very similar and for simplicity it is shown of flat construction which will retain the shape of a flat blank or if the blank is furnished to the dies having a curved or a slightly warped or irregular surface, it will reduce it to a flat shape. In this case the base 30 is surmounted by a plate 31 for holding the blank, the base having a perforation 32 and the blank holding plate a series of perforations 33. Above this plate a fixed distance is a second plate 34 having perforations 35 registering with the perforations 33. These two plates both have smooth surfaces and are fixed with respect to each other and separated by separating blocks 36. This provides a space 37 inside which the blank is placed. The plunger head 38 is provided with die punches or cutting dies 39 similar to those which have been described above. In this form of the invention the die punches or cutting dies are inserted in the head 38 in an improved manner. This head is provided with a depression 40 in the face thereof which conveniently may be of any desired shape but extends in from the outer surface for an appreciable distance. When the die is to be made, the punches are individually set on the bottom of this depression and spaced preferably by means of a templet or the like. In order to fix them permanently and securely in position, Babbitt or other metal is cast around them in the depression in the die. This unites with their surfaces and holds them properly in position. These dies are made of tempered steel and on account of the fact that the blanks are heated when the die cutting is to be performed, they may be made with flat surfaces, the cutting edges coming into engagement with the cutting edges of the tops of the perforations 33 in such a way as properly to cut the blank. The cutting operation is the same as described above in connection with the first three figures.

Another advantage of this construction is that in case a design has to be destroyed and it is desired to use part of the cutting blades again, the Babbitt or other metal can be melted out and the punches will be left in proper condition for reuse.

When the invention is carried out in this manner the blank is removed from the dies while it is still warm and placed in another die 43. This is an embossing die having a continuous depressed intaglio surface 44. This die differs from the die plate 14 in that there are not necessarily any perforations between the intaglio surfaces. The latter, however, are the same as those shown in Fig. 3. This embossing die is preferably made with a surrounding groove 45 to separate the embossing surface from the rest of the device and is provided with a pair of gages 46 which are normally pressed above the molding surface by means of springs 47. These gages are provided with guides 48 of any desired or convenient construction.

It is to be understood that when this process is carried out, the blanks are not necessarily reheated between the two operations, although where they are not intended to be curved or bent they can be reheated if desired. It will be understood of course that the flat dies are shown in these figures simply for the purpose of illustration and the same principle can be carried out with curved ones somewhat similar to those shown in the first three figures.

It will be noticed that the die 43 is shown as provided with a projecting stippled surface 49 between the intaglio surfaces thereof. This is of no utility when the whole apparatus is used for making perforated articles but it is merely illustrated to show that the embossing die can be used for the purpose of making articles which are not perforated. One objection to such articles has been that the ornamentation and the back-ground were both equally transparent or translucent and consequently at a short distance the ornamentation could not be seen. By providing a stippled surface on the die, an article is produced with a stippled surface between the ornamentations which sets them off and permits them to be readily seen.

While I have illustrated and described certain preferred forms in which the invention may be embodied, I am aware that many modifications may be made in all the forms illustrated and described without departing from the scope of the invention as expressed in the claims. Therefore, I do not wish to be limited to the particular details of construction shown, or of the method described, but What I do claim is:—

1. In a device of the character described, the combination of an embossing die having depressions and projections, a die coöperating therewith, a die plate having perforations corresponding in position and form with the projections on said embossing die, and a set of die punches coöperating with the perforated die plate and having a form and location corresponding to the perforations thereof.

2. In a device of the character described, the combination of a perforated plate, a plunger having a plurality of cutting dies thereon fitting the perforations in said plate, an embossing die above said plate having an intaglio surface corresponding to the parts between the perforations in said plate, the sunken portions thereof having rounded edges, and a gage on the perforated plate for registering the blank.

3. In a device of the character described, the combination of a curved perforated plate for holding a blank, a similarly curved perforated plate spaced therefrom, and a plunger having a plurality of cutting dies thereon fitting said perforations, the second plate being provided on its face toward the first named plate with a curved intaglio embossing surface between the perforations in said plate, the sunken portions thereof having rounded edges.

4. In a device of the character described, the combination of a base, a curved perforated plate fixed thereon, a gage extending upwardly from said plate, a movably mounted curved perforated plate above the first named plate having intaglio lower surfaces between the perforations thereof, and a plunger having dies thereon fitting the perforations in said plates and adapted to perforate a blank on the first named plate and to force the second plate down upon said blank to emboss it.

In testimony whereof I have hereunto set my hand, in the presence of two subscribing witnesses.

JOSEPH WILCOX.

Witnesses:
OTHELLO A. FAY,
ALBERT E. FAY.